United States Patent [19]

Nagasaki et al.

[11] Patent Number: 5,155,520
[45] Date of Patent: Oct. 13, 1992

[54] CAMERA APPARATUS HAVING IMAGE CORRECTING FUNCTION AGAINST INSTABILITY OF SHOOTING THEREOF

[75] Inventors: Tatsuo Nagasaki, Yokohama; Yasuhiro Komiya, Hachioji, both of Japan

[73] Assignee: Olympus Optical Co., Ltd., Tokyo, Japan

[21] Appl. No.: 635,929

[22] Filed: Dec. 28, 1990

[30] Foreign Application Priority Data

Jan. 16, 1990 [JP] Japan ............................... 2-4523

[51] Int. Cl.[5] .............................................. G03B 7/08
[52] U.S. Cl. .................................. 354/430; 354/70; 358/222; 359/554
[58] Field of Search ............... 354/430, 65, 70; 358/222; 350/500; 359/813, 814, 554-559

[56] References Cited

U.S. PATENT DOCUMENTS

| | | | |
|---|---|---|---|
| 4,448,510 | 5/1984 | Murakoshi | 354/289.12 |
| 4,623,930 | 11/1986 | Oshima et al. | 354/430 |
| 4,673,276 | 6/1987 | Yoshida et al. | 354/430 |
| 4,780,739 | 10/1988 | Kawakami et al. | 354/430 |
| 4,864,339 | 9/1989 | Gross et al. | 354/202 |

FOREIGN PATENT DOCUMENTS

| | | |
|---|---|---|
| 670711 | 6/1989 | Switzerland. |
| 0273319 | 7/1988 | European Pat. Off. |
| 1148951 | 4/1969 | United Kingdom. |
| 1442773 | 7/1976 | United Kingdom. |
| 3630385 | 3/1987 | Fed. Rep. of Germany. |
| 3628480 | 3/1987 | Fed. Rep. of Germany. |
| 4010729 | 10/1990 | Fed. Rep. of Germany. |

OTHER PUBLICATIONS

Intelligent Digital Image Stabilizer, by Kenya Uomori et al., pp. 177-180, 1989.

*Primary Examiner*—L. T. Hix
*Assistant Examiner*—David M. Gray
*Attorney, Agent, or Firm*—Frishauf, Holtz, Goodman & Woodward

[57] ABSTRACT

An object image is formed on an imaging surface through a photographing optical lens system. A first displacement detector detects a displacement associated with the photographing optical lens system within a plane perpendicular to an optical axis. A second displacement detector detects a displacement associated with the imaging surface within the plane perpendicular to the optical axis. A correct section corrects positional errors of the object image to be formed on the imaging surface by adjusting an optical, positional relationship between the photographing optical lens system and the imaging surface in accordance with displacement amounts detected by the first and second displacement detecter.

14 Claims, 8 Drawing Sheets

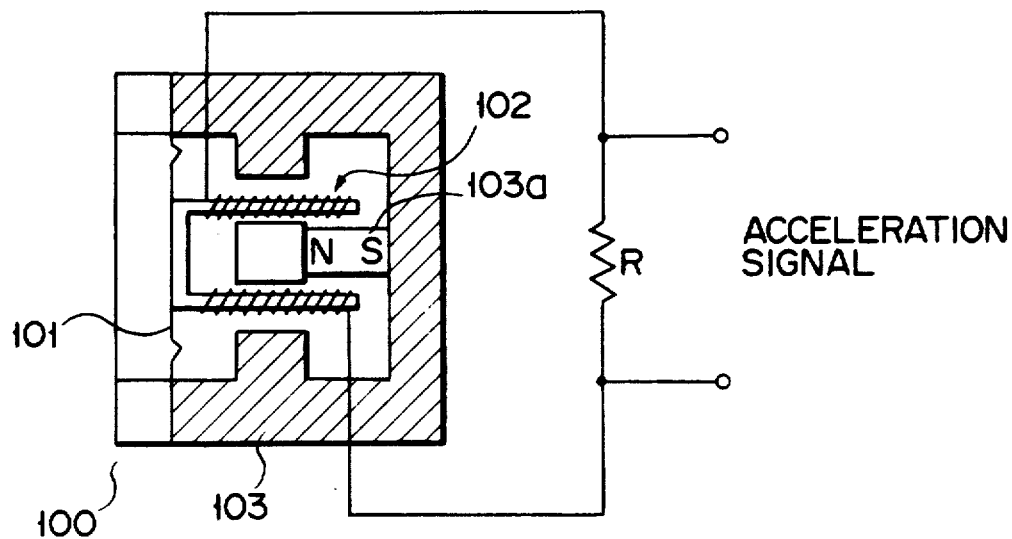
F I G. 9
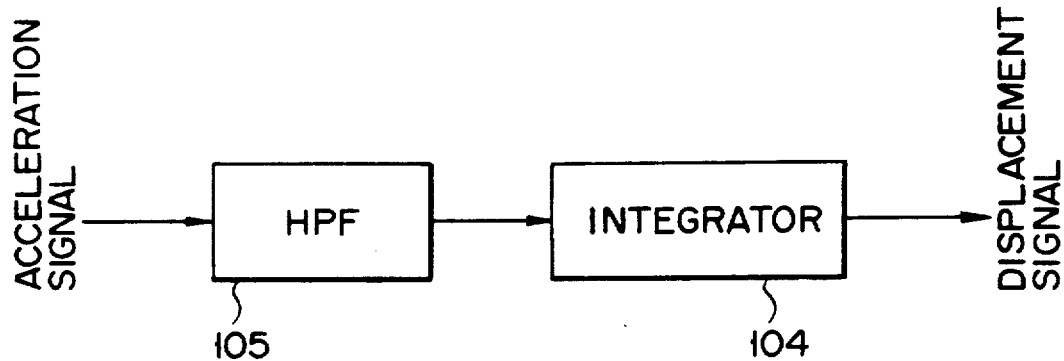
F I G. 10

CAMERA APPARATUS HAVING IMAGE CORRECTING FUNCTION AGAINST INSTABILITY OF SHOOTING THEREOF

BACKGROUND OF THE INVENTION

1. Field of the Invention

The present invention generally relates to a camera apparatus and, more particularly, to a camera apparatus having a so-called shooting instability correction function for correcting blurring of an object image which is caused by instability of shooting.

2. Description of the Related Art

In film exposure for an object image by means of a camera, i.e., a photographic operation by means of a camera, a positional error of an object image formed on a film surface may be caused due to instability of shooting (camera shake). Such instability of shooting poses a serious problem especially when a long-time exposure operation is to be performed or when a telephoto shot or a macroscopic shot is to be performed.

In a conventional technique, in order to take a picture with high clearness (resolution) by preventing such instability of shooting, a camera is fixed to a tripod or an auxiliary light source such as an electronic flash is used to perform a short-time exposure operation (high-speed photographic operation) in which instability of shooting can be substantially neglected. However, the use of such an auxiliary device is generally regarded as a very cumbersome operation and greatly impairs the operability and transportability of a camera.

Such a problem is also posed in an electronic still camera for electronically imaging an object image by using a solid-state image pickup element such as a CCD. Therefore, a great demand has arisen for a means for solving the problem.

As described above, in the conventional technique, in order to prevent instability of shooting, an auxiliary device such as a tripod must be used, and hence a problem is posed in terms of operability.

SUMMARY OF THE INVENTION

It is, therefore, an object of the present invention to provide a new and improved camera apparatus having an image correcting function against instability of shooting thereof which can effectively correct so-called instability of shooting by correcting positional errors of an image on an image formation surface in shooting of an object image.

According to the present invention, there is provided a camera apparatus comprising:

a photographing optical lens system;

an imaging surface on which an object image is formed through the photographing optical lens system;

first displacement detection means for detecting a displacement associated with the photographing optical lens system within a plane perpendicular to an optical axis;

second displacement detection means for detecting a displacement associated with the imaging surface within the plane perpendicular to the optical axis; and correct means for correcting positional errors of the object image to be formed on the imaging surface by adjusting an optical, positional relationship between the photographing optical lens system and the imaging surface in accordance with displacement amounts detected by the first and second displacement detection means.

More specifically, according to the present invention, there is provided a camera for electronically imaging an object image, formed on a predetermined imaging surface through a photographing optical lens, by using a film or an image pickup element, comprising:

a first acceleration sensor group for detecting a displacement of the photographing optical lens system within a plane perpendicular to an optical axis; and a second acceleration sensor group for detecting a displacement of the imaging surface within a plane perpendicular to the optical axis, wherein an optical, positional relationship between the photographing optical lens and the imaging surface is changed in accordance with displacement amounts detected by the first and second acceleration sensor groups by using an actuator mechanism for displacing at least one of the photographing optical lens and the imaging surface in a direction perpendicular to the optical axis, thereby correcting positional errors of the object image formed on the imaging surface.

That is, the present invention is characterized in that the positional errors of the image on the predetermined imaging surface are obtained on the basis of the displacement amounts, of the photographing optical lens and the imaging surface, obtained by the first and second acceleration sensor groups respectively arranged at the photographing optical lens position and the imaging surface position, and the optical, positional relationship between the photographing optical lens and the imaging surface is changed to correct these positional errors.

According to the present invention, a positional error (displacement) amount of the photographing optical lens is obtained by the first acceleration sensor group arranged on the photographing optical lens position. At the same time, a positional error (displacement) amount of the imaging surface is obtained by the second acceleration sensor group arranged at the imaging surface position. While positional errors of an object image formed on the imaging surface are sequentially detected on the basis of these positional error (displacement) amounts, the optical, positional relationship between the photographing optical lens and the imaging surface with respect to an object to be photographed is changed. With this operation, an object image can be formed on a predetermined image formation surface by the photographing optical lens without positional errors throughout an exposure period, thereby effectively preventing errors caused by instability of shooting (camera shake).

In addition, displacement amounts of an object image on the imaging surface can be easily and effectively detected on the basis of displacements, of the photographing optical lens and of the imaging sensor groups respectively arranged at the photographing optical lens position and the imaging surface position. The optical, positional relationship between the photographing optical lens and the imaging surface with respect to an object to be photographed is changed in accordance with the displacement amounts. Therefore, the positional errors of the object image on the image formation surface can be effectively corrected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 9 is a view showing an example of an arrangement of an acceleration sensor used in the present invention;

FIG. 10 is a view showing an example of an arrangement of a displacement sensor used in the present invention;

DETAILED DESCRIPTION OF THE PREFERRED EMBODIMENTS

Figure 1A:
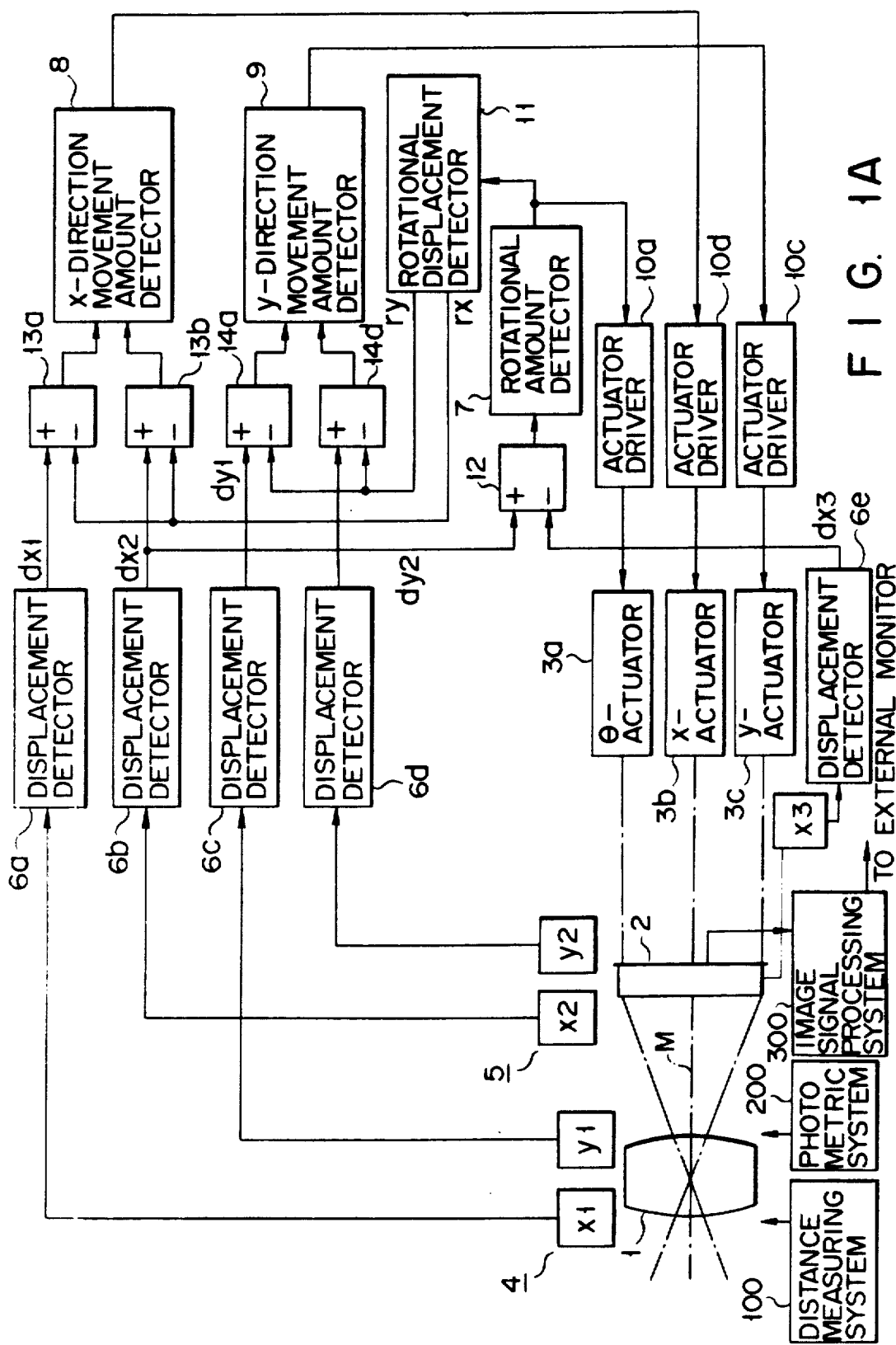
FIG. 1A is a schematic view showing a main part of a camera apparatus according to the first embodiment of the present invention.

Reference will now be made in detail to the presently preferred embodiments of the invention as illustrated in the accompanying drawings, in which like reference characters designate like or corresponding parts throughout the several drawings.

Several embodiments of a camera apparatus according to the present invention will be described below with reference to the accompanying drawings.

FIG. 1A is a schematic view of an electronic still camera according to the first embodiment of the present invention. Reference numeral 1 denotes a photographing optical lens system; and 2, a solid-state image pickup element such as a CCD for electronically imaging an object image formed by the photographing optical lens system 1. The photographing optical lens system 1 is driven by a distance measuring system 100 to form an object image on an imaging surface of the solid-state image pickup element 2. In addition, an aperture mechanism, a shutter mechanism, and the like incorporated in the photographing optical lens system 1 are driven under the control of a photometric system 200 to optimize the exposure amount of an object image in the solid-state image pickup element 2.

Note that the distance measuring system 100, the photometric system 200, and an image signal processing system 300 for processing an image signal from the solid-state image pickup element 2 and outputting it to an external image monitor are to be respectively realized by properly using various conventional techniques. In addition, their functions are not directly associated with the gist of the present invention, and hence a description thereof will be omitted.

Figure 1B:
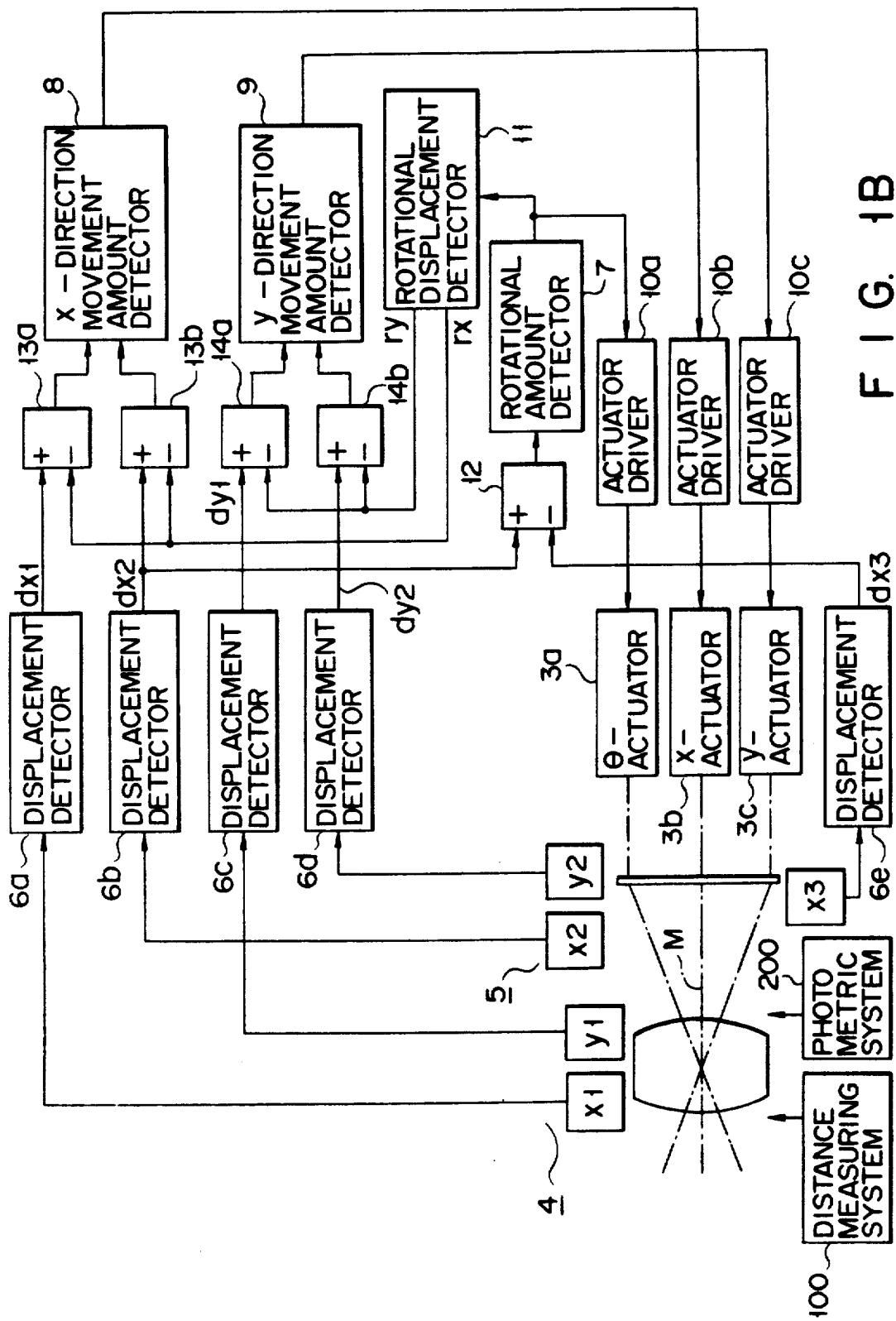
FIG. 1B is a schematic view showing a main part of a modification of the apparatus shown in FIG. 1A.

A case will be described below, in which the present invention is applied to an electronic still camera for electronically imaging an object image by using a solid-state image pickup element such as a CCD. In a camera for photographing an object by using a silver chloride film, a film F is arranged at the position of the imaging surface of the solid-state image pickup element 2, as shown in FIG. 1B.

The first characteristic feature of the camera apparatus according to the first embodiment is that the solid-state image pickup element 2 is supported through a 8-actuator 3a, an x-actuator 3b, and a y-actuator 3c constituting an actuator mechanism so as to be freely rotated about an optical axis M of the element 2 and to be freely moved on a plane perpendicular to the optical axis M in the x direction (horizontal direction) and in the y direction (vertical direction) so that an optical, positional relationship between an object and the photographing optical lens system 1 can be displaced, as will be described later.

In addition, in order to perform displacement control of the imaging surface of the solid-state image pickup element 2, the camera apparatus of this embodiment includes first and second displacement sensor groups 4 and 5 which are respectively arranged at the mounting positions of the photographing optical lens system 1 and the solid-state image pickup element 2 so as to detect their displacements.

Figure 2:
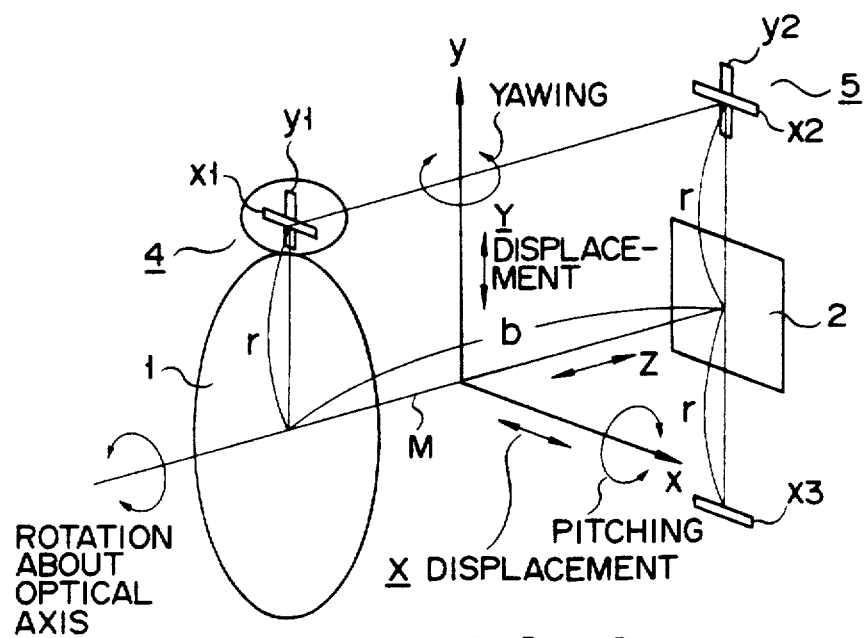
FIG. 2 is a view showing an arrangement of an acceleration sensor in the camera apparatus in FIG. 1A.

More specifically, the first displacement sensor group 4, arranged at the mounting position of the photographing optical lens system 1, is constituted by acceleration sensors x1 and y1 for respectively detecting horizontal and vertical displacements of the photographing optical lens system 1, as shown in FIG. 2. These acceleration sensors x1 and y1 are arranged at positions separated from the optical axis M by a distance r such that their sensing directions are perpendicular to each other.

The second displacement sensor group 5 arranged at the mounting position of the solid-state image pickup element 2 is constituted by two acceleration sensors x2 and x3 for detecting horizontal displacements of the solid-state image pickup element 2, and an acceleration sensor y2 for detecting a vertical displacement of the element 2. These acceleration sensors x2, x3, and y2 are arranged at positions separated from the optical axis M by the distance r of the solid-state image pickup element 2 such that their sensing directions are perpendicular to each other. Especially, the acceleration sensors x2 and x3 are arranged at positions which are symmetrical with each other about the optical axis M of the solid-state image pickup element 2 so that horizontal displacements of the solid-state image pickup element 2 are detected at the two positions which are symmetrical with each other about the optical axis M.

These acceleration sensors x1, x2, x3, y1, and y2 are designed to detect displacements in their sensing directions as movement accelerations. Acceleration data detected by these acceleration sensors are respectively obtained as displacements dx1, dx2, dx3, dy1, and dy2 at respective positions.

A rotational amount detector 7, an x-direction movement amount detector 8, and a y-direction movement amount detector 9 respectively detect positional errors of an object image on the imaging surface of the solid-state image pickup element 2 as a rotational displacement amount of an object image on the imaging surface of the solid-state image pickup element 2, and translational displacement amount in the x and y directions in accordance with the displacements dx1, dx2, dx3, dy1, and dy2. The actuators 3a, 3b, and 3c are respectively driven through actuator drivers 10a, 10b, and 10c so as to optically displace the imaging surface of the solid-state image pickup element 2, thus correcting the positional errors of the object image on the imaging surface.

Displacement control of the imaging surface of the solid-state image pickup element 2 is performed by driving these actuators 3a, 3b, and 3c in a negative feedback manner in a direction to correct the detected displacements of an object image on the imaging surface. By performing such negative feedback control, the imaging surface of the solid-state image pickup element 2 is displaced in accordance with displacements of the object image formed on the imaging surface of the solid-state image pickup element 2, thus correcting the positional errors of the imaging position of the object image on the imaging surface.

Such positional error correction will be described in more detail below. As shown in FIG. 2, an x-y-z three-dimensional space is defined such that the direction of the optical axis of the photographing optical system is a z-axis; a lateral (horizontal) direction perpendicular to the optical axis, an x-axis; and a longitudinal (vertical) direction perpendicular to the optical axis, a y-axis. In this case, positional errors of an object image on the imaging surface are given as displacements of the photographing optical lens system 1 or the solid-state image pickup element 2 in the x and y directions, pitching about the x-axis between the photographing optical lens system 1 and the solid-state image pickup element 2, yawing about the y-axis therebetween, and a rotational displacement about the optical axis of the solid-state image pickup element 2.

That is, a displacement of an object image on the imaging surface in the x direction is caused by a displacement of the photographing optical lens system 1 or the solid-state image pickup element 2 in the x direction and its yawing. A displacement of the object image on the imaging surface in the y direction is caused by a displacement of the photographing optical lens system 1 or the solid-state image pickup element 2 in the y direction and its pitching.

Figure 3A:
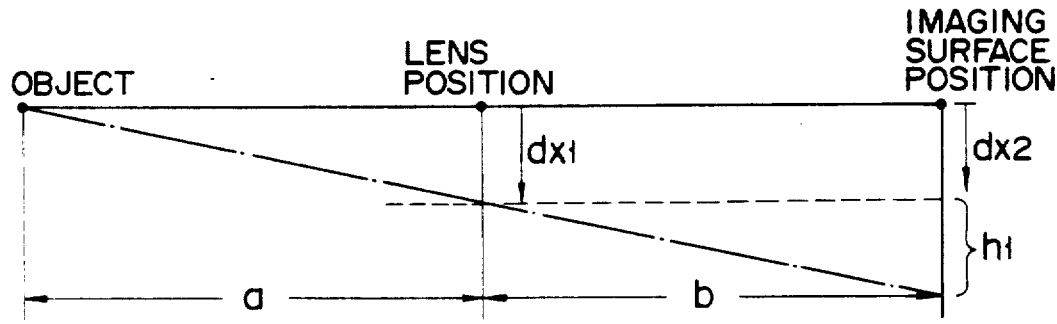
FIGS. 3A to 5 are views showing positional error detection in the camera apparatus in FIG. 1A.

A description will be made below with regard to a displacement of an object image on the imaging surface in the x direction. Assume that the photographing optical lens system 1 and the solid-state image pickup element 2 are translated from an object (to be photographed) in the horizontal direction (x direction) by dx1 (=dx2). As FIG. 3A shows an optical state of this case, a displacement h1 on the imaging surface, a distance a between an object point (object image position) and the photographing optical lens system 1, and a distance b between the photographing optical lens system 1 and the imaging surface position have the following relationship:

$$dx1:a = h1:b$$

Therefore, $$h1 = \left(\frac{b}{a}\right)dx1 = \left(\frac{b}{f} - 1\right)dx1$$

where f is the focal length of the photographing optical lens system 1 and is set to satisfy the following relation:

$$1/a + 1/b = 1/f$$

Assume that yawing is caused in the optical, positional relationship between the photographing optical lens system 1 and the solid-state image pickup element 2, and that the photographing optical lens system 1 is displaced by an amount dx1, or the solid-state image pickup element 2 is displaced by an amount dx2. In this case, a displacement h2 on the imaging surface is represented by:

$$h2 = dx2 - dx1$$

Figure 3B:
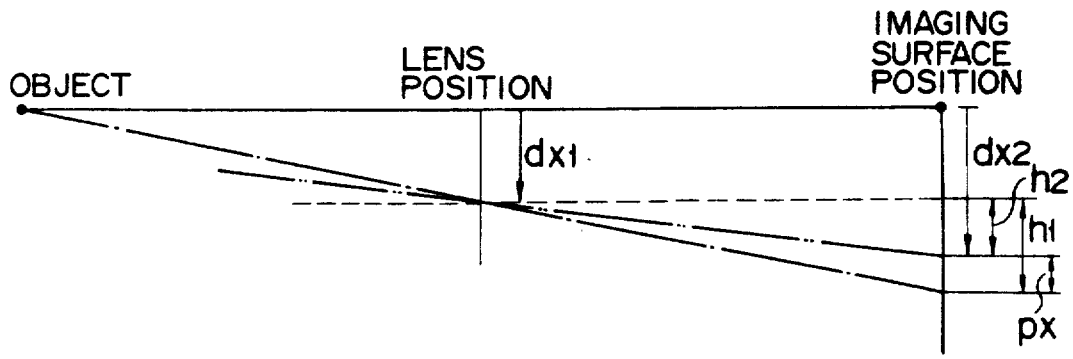

As shown in FIG. 3B, therefore, when yawing and translational movement occur in the x direction, an actual displacement amount px of the object image on the imaging surface of the solid-state image pickup element 2 is given by:

$$px = h1 - h2$$
$$= \frac{b}{f}dx1 - dx2$$

A similar relation can be established with respect to a displacement in the y direction. That is, when pitching and translational movement in the y direction occur, an actual displacement amount py of the object image on the imaging surface is given by:

$$Py = \frac{b}{f}dy1 - dy2$$

Figure 4:
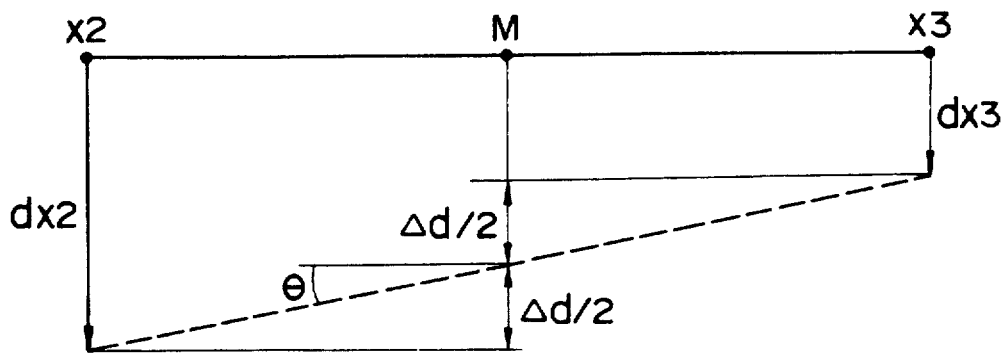

If a rotational displacement, of the photographic optical system, about the optical axis occurs, this rotational displacement amount can be obtained as a difference between displacements detected at the two points symmetrical to each other about the optical axis M. More specifically, as shown in FIG. 4, when the displacement amounts dx2 and dx3 are obtained by the upper and lower acceleration sensors x2 and x3 arranged to be symmetrical to each other about the optical axis M of the solid-state image pickup element 2, a displacement difference Δd is given by:

$$\Delta d = dx2 - dx3$$

An angle θ of the rotational displacement, of the solid-state image pickup element 2, about the optical axis M is obtained from the displacement difference Δd as follows:

$$\theta = \tan^{-1}\left(\frac{\Delta d/2}{r}\right)$$

The camera apparatus of the first embodiment is essentially designed such that displacement amounts of an object image formed on the imaging surface of the solid-state image pickup element 2 through the photographing optical lens system 1 are obtained in the above-described manner as px, py, and θ on the basis of the displacement amounts dx1 and dy1 of the photographing optical lens system 1 and the displacement amounts dx2, dx3, and dy2 of the solid-state image pickup element 2 which are detected by the acceleration sensors x1, x2, x3, y1, and y2.

While a rotational displacement is present, displacement components in the x and y directions caused by the rotational displacement are erroneously detected as the above-mentioned translational displacement components. Therefore, when a rotational displacement occurs, displacement components in the x and y directions caused by the rotational displacement must be subtracted from the translational displacement components, in the x and y directions, detected in the above-described manner.

Figure 5:
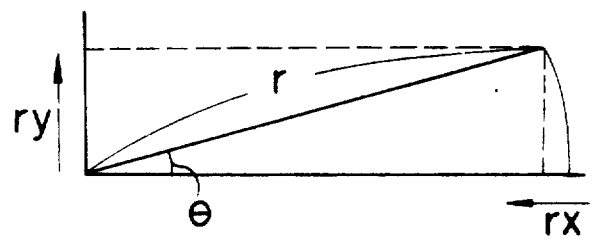

When the rotational angle θ of the rotational displacement is obtained in the above-described manner, an x-displacement component rx and a y-displacement component ry are obtained from the rotational angle θ obtained on the basis of the difference between translational displacements in the x direction, as shown in FIG. 5:

$$r_x = r(1 - \cos\theta)$$

$$r_y = r \sin\theta$$

Displacement components in the x and y directions which are caused by this rotational displacement are subtracted from the displacement amounts dx1, dy1, dx2, and dy2:

$$dx1' = dx1 - r_x$$
$$dy1' = dy1 - r_y$$
$$dx2' = dx2 - r_x$$
$$dy2' = dy2 - r_y$$

thereby, obtaining translational displacement components after correction of the rotational displacement. The above-mentioned positional error correction can be performed by using these displacement amounts dx1', dy1', dx2', and dy2'.

According to the first embodiment, therefore, the camera apparatus having the arrangement shown in FIG. 1 is designed such that a subtracter 12 is used to obtain a displacement difference (dx2−dx3) between the x-direction displacement amount dx2, at an upper portion of the imaging surface, detected by the acceleration sensor x2 through a displacement detector 6b and the x-direction displacement amount dx3, at a lower portion of the imaging surface, detected by the acceleration sensor x3 through a displacement detector 6e, and the rotational displacement angle θ is detected from the displacement difference (dx2−dx3) by the rotational amount detector 7. In accordance with the rotational displacement angle θ, the actuator driver 10a is operated to drive the θ-actuator 3a so as to rotate the imaging surface of the solid-state image pickup element 2 through the angle θ, thus correcting the rotational displacement.

Meanwhile, the displacement components rx and ry in the x and y directions, caused by the rotational displacement, are obtained by a rotational displacement detector 11 on the basis of the rotational displacement angle θ in the above-described manner. Subsequently, the x-direction displacement component rx caused by the rotational displacement is supplied to subtracters 13a and 13b so as to correct the x-direction displacement amount dx1, of the photographing optical lens system 1, detected by the acceleration sensor x1 through a displacement detector 6a, and to correct the x-direction displacement amount dx2, on the imaging surface, detected by the acceleration sensor x2 through the displacement detector 6b. Similarly, the y-direction displacement component ry caused by the rotational displacement is supplied to subtracters 14a and 14b so as to correct the y-direction displacement amount dy1, of the photographing optical lens system 1, detected by the acceleration sensor y1 through a displacement detector 6c, and to correct the y-direction displacement amount dy2, on the imaging surface, detected by the acceleration sensor y2 through a displacement detector 6d.

The x-direction movement amount detector 8 obtains the x-direction displacement amount $P_x$ of the object image on the imaging surface on the basis of the x-direction displacement amounts dx1' and dx2' obtained by the subtracters 13a and 13b, and starts the actuator driver 10b to correct this translational displacement in the x direction. As a result, the x-actuator 3b is driven to translate the imaging surface of the solid-state image pickup element 2 by an amount px in the x direction, thus correcting the translational displacement.

Similarly, the y-direction movement amount detector 9 obtains the y-direction displacement amount py of the object image on the imaging surface on the basis of the y-direction displacement amounts dy1' and dy2' obtained by the subtracters 14a and 14b in the above-described manner, and starts the actuator driver 10c to correct this y-direction translational displacement. As a result, the y-actuator 3c is driven to translate the imaging surface of the solid-state image pickup element 2 by an amount py in the y direction, thus correcting the translational displacement.

According to the camera apparatus, of the first embodiment, having the above-described arrangement, the imaging position errors of the object image, on the imaging surface, caused by these displacements can be detected as the above-mentioned values θ, px, and py on the basis of the x-direction and y-direction displacement amounts dx1 and dy1, of the photographing optical lens system 1, detected by the acceleration sensors x1 and y1 arranged at the mounting position of the photographing optical lens system 1, and the x-direction and y-direction displacement amounts dx2, dx3, and dy2, of the imaging surface of the solid-state image pickup element 2, detected by the acceleration sensors x2, x3, and y2 arranged at the imaging surface position of the solid-state image pickup element 2.

The actuator mechanism is driven in accordance with these detected displacement amounts θ, px, and py, and the imaging surface of the solid-state image pickup element 2 is displaced to correct these displacements, thereby forming the object image on the imaging surface without any displacement.

With such processing, even if positional errors are caused by instability of shooting during exposure of an object image in the solid-state image pickup element 2, the errors can be effectively corrected to allow a photographic operation (exposure) without blurring of an image.

In the first embodiment described above, a total of five acceleration sensors x1, x2, x3, y1, and y2 are used to detect rotational and translational displacements of an object image. However, detection may be performed by using four acceleration sensors x1, x2, y1, and y2, i.e., two sensors for the x direction, and two sensors for the y direction.

Figure 7:
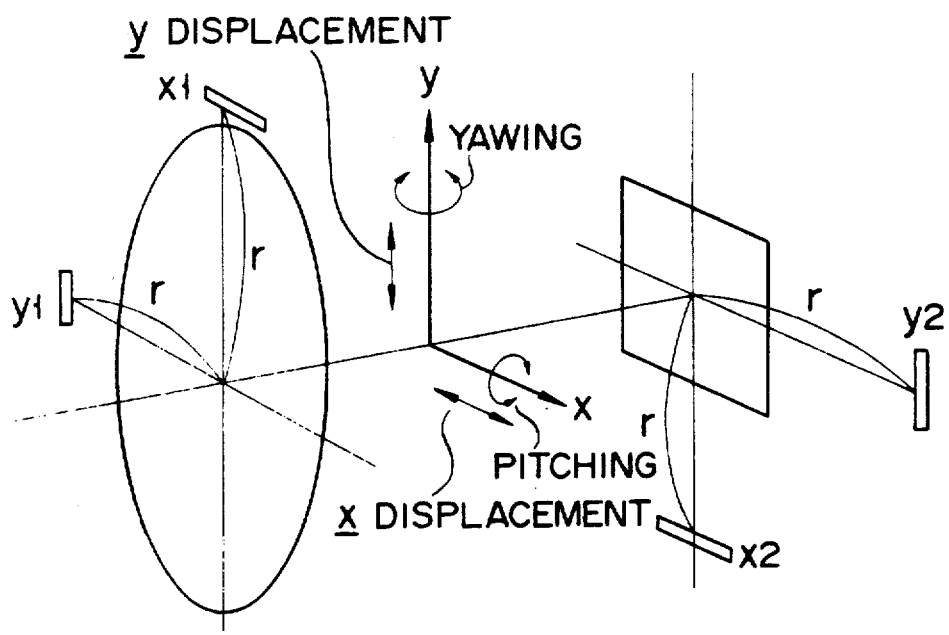
FIG. 7 is a view showing an arrangement of an acceleration sensor in the camera apparatus in FIG. 6.
Figure 6:
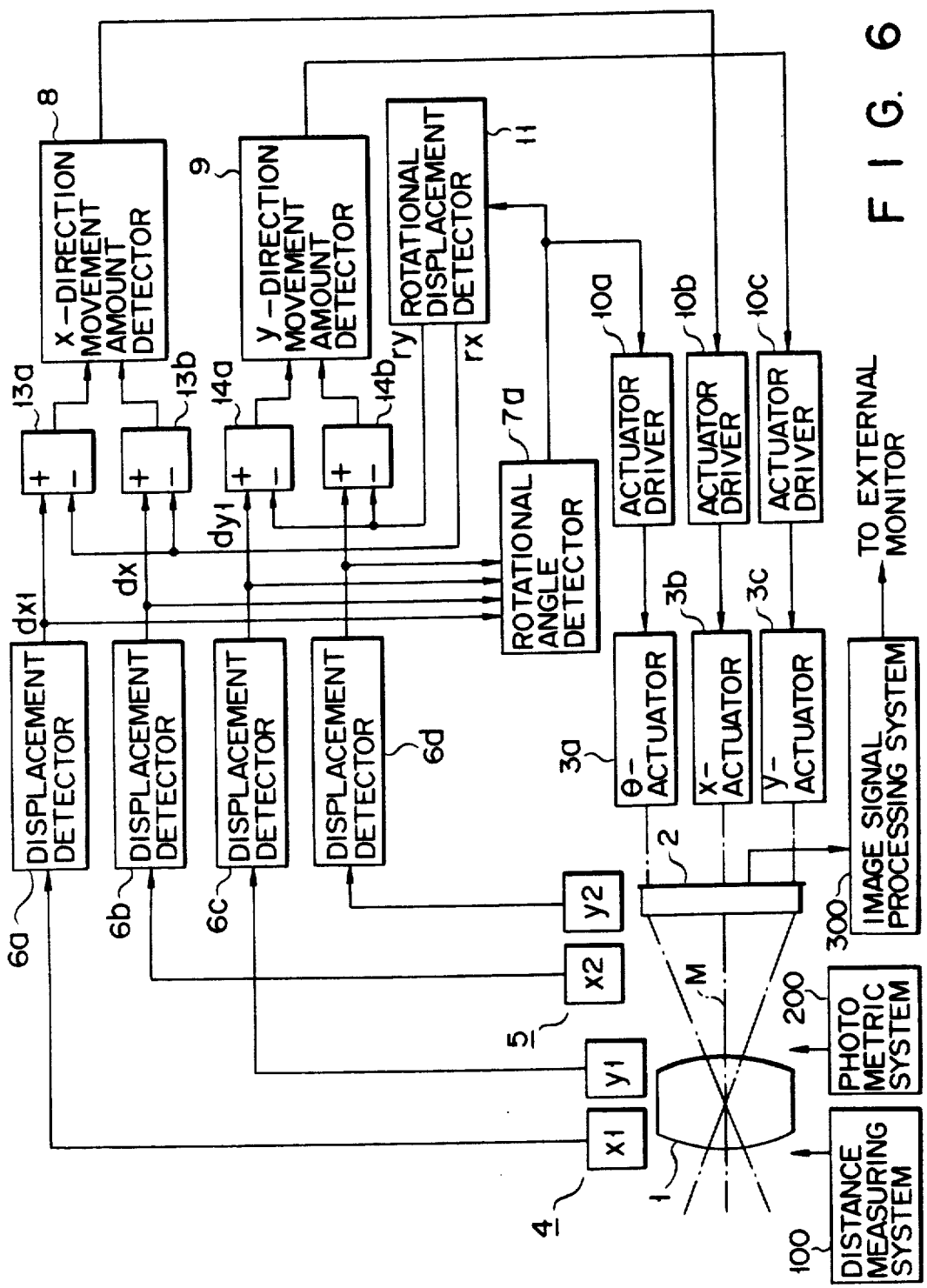
FIG. 6 is a schematic view showing a main part of a camera apparatus according to the second embodiment of the present invention.

FIGS. 6 and 7 show a camera apparatus according to the second embodiment of the present invention, which is designed to perform positional error correction by using four acceleration sensors x1, x2, y1, and y2. The same reference numerals in the second embodiment denote the same parts as in the first embodiment.

The camera apparatus according to the second embodiment is characterized as follows. As shown in FIG. 7, acceleration sensors x1 and y1 arranged at the mounting position of a photographing optical lens system 1, and acceleration sensors x2 and y2 arranged at the position of the imaging surface of a solid-state image pickup element 2 are arranged to be symmetrical with each other about an optical axis M in the respective directions. Rotational displacement amounts $\theta_x$ and $\theta_y$ are detected by a rotational angle detector 7a on the basis of displacement amounts dx1 and dx2 detected by the acceleration sensors x1 and x2, and displacement amounts dy1 and dy2 detected by acceleration sensors y1 an y2, which are located at the symmetrical positions:

$$\theta_x = \tan^{-1}\left(\frac{dx2 - dx1}{2r}\right)$$

and $$\theta_y = \tan^{-1}\left(\frac{dy2 - dy1}{2r}\right)$$

The rotational angle detector 7a is designed to obtain a rotational displacement angle $\theta$ with high precision by averaging the rotational displacement amounts $\theta_x$ and $\theta_y$, which are detected from the displacement amounts in the x and y directions, as follows:

$$\theta = (\theta_x + \theta_y)/2$$

According to the camera apparatus, of the second embodiment, having the above-described arrangement, although arithmetic processing in the rotational angle detector 7a is slightly complicated, both rotational and translational displacements can be detected and corrected by using the four acceleration sensors x1, x2, y1, and y2 arranged to be symmetrical with each other about the optical axis M in the x and y directions. Therefore, the sensing mechanism can be greatly simplified.

Figure 8:
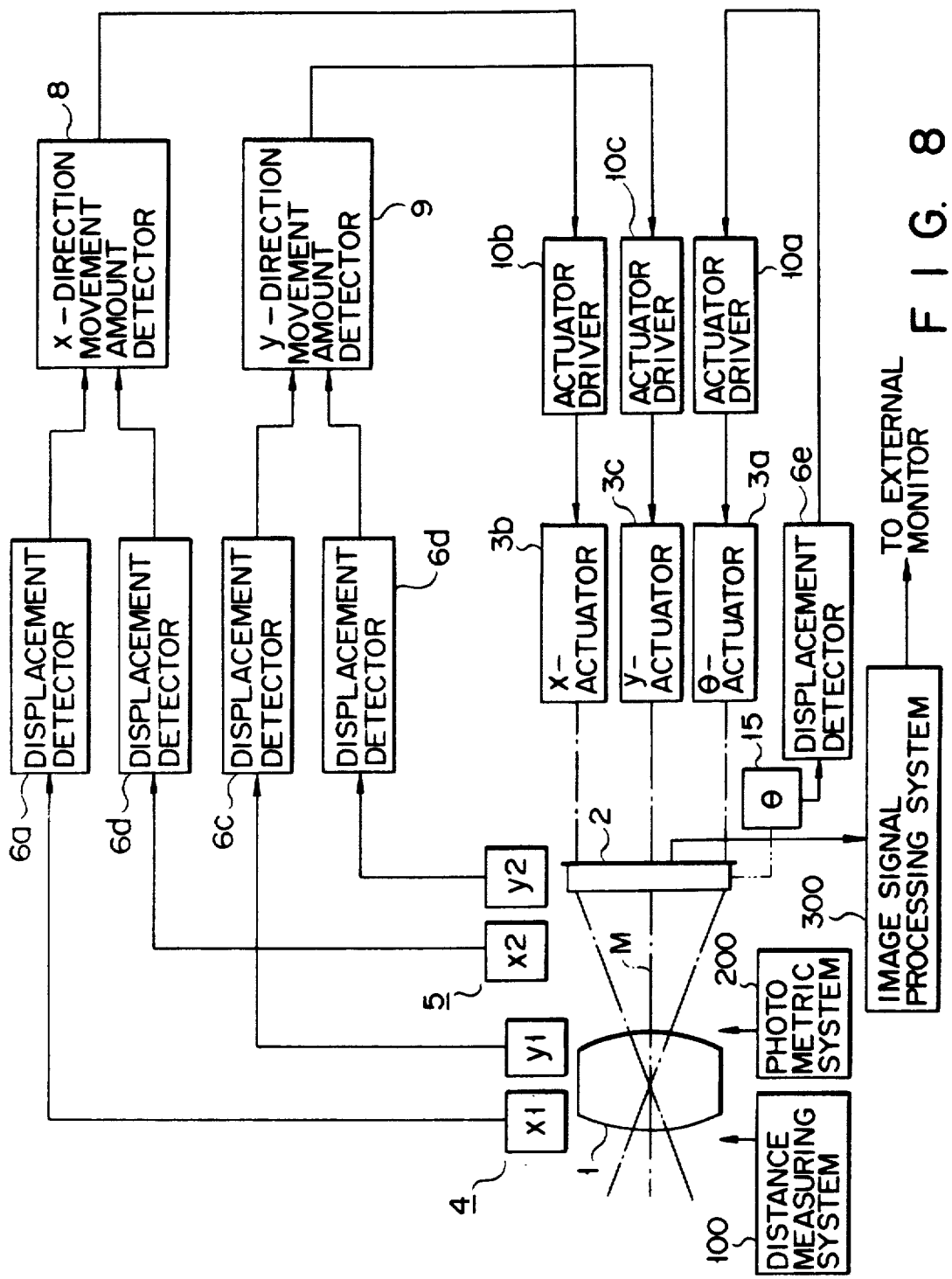
FIG. 8 is a schematic view showing a main part of a camera apparatus according to the third embodiment of the present invention.
Figure 11A:
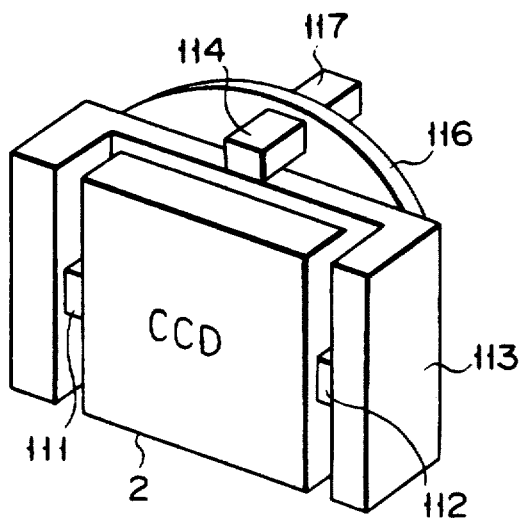
FIG. 11A is a perspective view showing an example of an arrangement of an actuator mechanism used in the present invention.
Figure 11B:
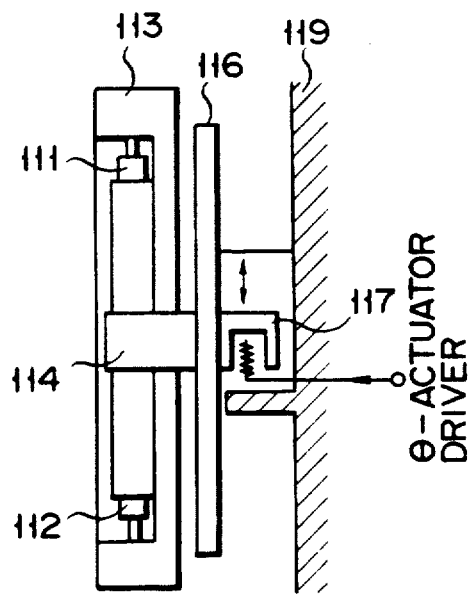
FIGS. 11B to 11D are plan, front, and side views of the actuator mechanism in FIG. 11A, respectively.
Figure 11C:
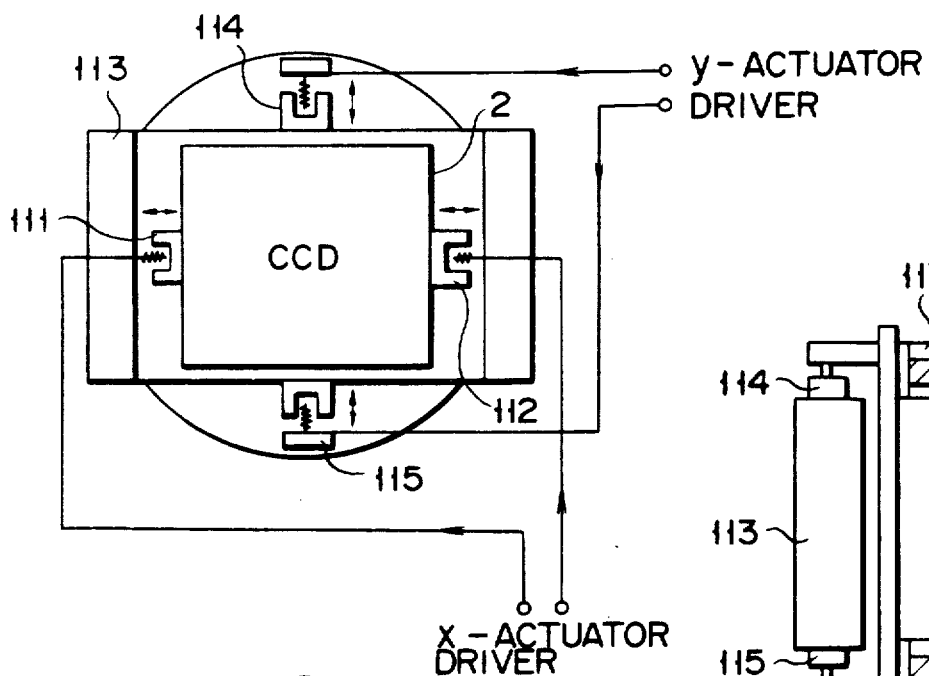
Figure 11D:
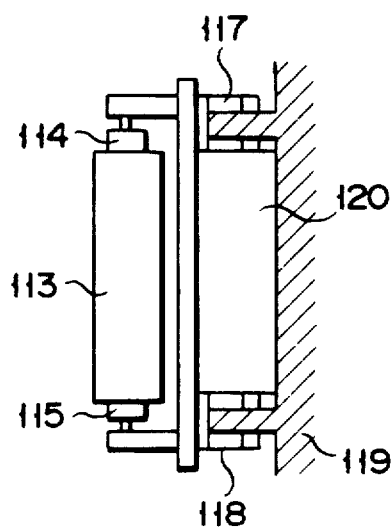

The arrangement of the camera apparatus may be further simplified in the following manner. For example, as in the third embodiment shown in FIG. 8, an acceleration sensor 15 is used to exclusively detect a rotational displacement. In this arrangement, while rotational displacement correction is performed by driving a $\theta$-actuator 3a in accordance with a rotational displacement amount detected by the acceleration sensor 15, correction of translational displacements is performed in accordance with displacement amounts in the x and y directions, which are obtained by the above-mentioned four acceleration sensors x1, x2, y1, and y2. It is, however, apparent that x-direction and y-direction displacement amounts obtained by displacement detectors 6a to 6d can be corrected on the basis of a rotational displacement amount obtained by a displacement detector 6e in the same manner as in the first and second embodiments.

As described above with reference to the first to third representative embodiments of the present invention, in the present invention, displacement amounts of the photographing optical lens system 1 and of the solid-state image pickup element 2 are detected by using the displacement sensors, i.e., the acceleration sensors, respectively arranged at the mounting positions of the photographing optical lens system 1 and the solid-state image pickup element 2, and displacement amounts of an object image formed on the imaging surface of the solid-state image pickup element 2 by the photographing optical lens system 1 are obtained in accordance with these detected displacement amounts. Positional error correction is then performed by changing the optical, positional relationships among the object image, the photographing optical lens system 1, and the solid-state image pickup element 2 in accordance with the detected displacement amounts.

With this processing, blurring of the object image on the imaging surface during exposure (photography) can be effectively prevented, and a clear image having a high resolution can be effectively formed.

The present invention is not limited to the above-described embodiments. In each embodiment, an electronic camera for electronically imaging an object image by using the solid-state image pickup element 2 is exemplified. However, the present invention can be applied to a camera for photographing an object by using a silver chloride film. In this case, for example, a film holder is supported in a camera body using a double casing structure so that displacement of the film holder itself is controlled by using an actuator mechanism such as a voice coil. In addition, displacement control of the photographing optical lens system 1 may be performed by using an actuator mechanism to perform positional error correction. In this case, however, since a rotational displacement of the photographing optical lens system 1 cannot be corrected by rotating it, a rotational displacement may be provided by using, e.g., a prism. A displacement detection technique and an arrangement of sensors may be determined in accordance with specifications of a camera apparatus. Various other changes and modifications can be made within the spirit and scope of the invention.

FIG. 9 shows a dynamic acceleration sensor 100, based on electromagnetic induction, as a practical example of each acceleration sensor used in each embodiment described above. The acceleration sensor 100 is designed to detect an electromotive force, as an acceleration signal, corresponding to a change in relative positional relationship, caused by instability of shooting, between a coil 102 and a permanent magnet 103a of a magnetic circuit 103 through a resistor R. The coil 102 is arranged on the photographing optical lens system 1 or on the solid-state image pickup element 2 through a support spring 101. The magnetic circuit 103 houses the coil 102. The resistor R is connected between the two ends of the coil 102.

FIG. 10 shows a case wherein an integrator 104 for obtaining a displacement signal by integrating an acceleration signal is used a practical example of each displacement detector in each embodiment described above. In this case, an accurate displacement signal can be obtained by removing a bias component of an acceleration signal by using a high pass filter 105 in front of the integrator 104.

FIGS. 11A to 11D show a practical example of the actuator used in each embodiment described above. An actuator mechanism 110 includes a support member 113 for horizontally supporting the solid-state image pickup element 2 through first and second moving coils 111 and 112, a rotating plate 116 for vertically supporting the support member 113 through third and fourth moving coils 114 and 115, and a support member 120 for horizontally and rotatably supporting the rotating plate 116 on a camera main body 119 through fifth and sixth moving coils 117 and 118.

The actuator mechanism 110 is designed to transmit an x-direction displacement to the solid-state image pickup element 2 through the first and second moving coils 111 and 112; a y-direction displacement, through the third and fourth moving coils 114 and 115; and a rotational ($\theta$) displacement, through the fifth and sixth moving coils 117 and 118.

Note that one moving coil may be used in each direction.

As has been described above, according to the present invention, positional errors of an object image on an imaging surface can be very easily and effectively detected, and optical, positional relationships among the respective components are controlled to correct the positional errors. Therefore, various practical advantages can be obtained. For example, an object can be effectively photographed with high resolution without causing blurring of an object image due to instability of shooting.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A camera apparatus comprising:
   a photographing optical lens system;
   an imaging surface on which an object image is formed through said photographing optical lens system;
   first displacement detection means for detecting a displacement associated with said photographing optical lens system within a plane perpendicular to an optical axis;
   second displacement detection means for detecting a displacement associated with said imaging surface within the plane perpendicular to the optical axis; and
   correct means for correcting positional errors of the object image to be formed on said imaging surface by adjusting an optical, positional relationship between said photographing optical lens system and said imaging surface in accordance with displacement amounts detected by both said first and second displacement detection means.

2. An apparatus according to claim 1, wherein said imaging surface includes one of a film exposure surface of a film photosensitive to the object image and an imaging surface of an image pickup element for electronically imaging an object image.

3. An apparatus according to claim 1, wherein said correct means includes an actuator mechanism for displacing at least one of said photographing optical lens system and said image surface in accordance with the detected displacement amounts.

4. An apparatus according to claim 1, wherein said correct means includes one of an actuator mechanism for rotating said imaging surface in accordance with the detected displacement amounts and a mechanism for rotating the object image formed on the imaging surface.

5. An apparatus according to claim 1, wherein said first displacement detection means includes a first x-direction acceleration sensor for detecting a lateral displacement of said photographing optical lens system about the optical axis, and a first y-direction acceleration sensor for detecting a longitudinal displacement of said photographing optical lens system, and said second displacement detection means includes a second x-direction acceleration sensor for detecting a lateral displacement of said imaging surface about the optical axis, and a second y-direction acceleration sensor for detecting a longitudinal displacement of said imaging surface.

6. An apparatus according to claim 5, wherein said first and second x-direction acceleration sensors are arranged at positions which are symmetrical with each other about the optical axis, and said first and second y-direction acceleration sensors are arranged at positions which are symmetrical with each other about the optical axis.

7. An apparatus according to claim 5, wherein said second displacement detection means includes a third x-direction acceleration sensor arranged at a position which is symmetrical with the position of said second x-direction acceleration sensor about the optical axis.

8. An apparatus according to claim 7, wherein outputs from said second and third x-direction acceleration sensors are provided to detect rotational displacement amounts of the imaging surface in the x and y directions, outputs from said first and second x-direction acceleration sensors and the rotational displacement amount in the x direction are provided to detect a correction amount in the x direction, and outputs from said first and second y-direction acceleration sensors and the rotational displacement amount in the y direction are provided to detect a correction amount in the y direction.

9. An apparatus according to claim 5, wherein said second displacement detection means includes an acceleration sensor for detecting a rotation displacement.

10. An apparatus according to claim 5, wherein outputs from said first and second x-direction acceleration sensors are provided to detect a correction amount in the x direction, and outputs from said first and second y-direction acceleration sensors are provided to detect a correction amount in the y direction.

11. An apparatus according to claim 6, wherein outputs from said first and second x-direction acceleration sensors and from said first and second y-direction acceleration sensors are provided to detect rotational displacement amounts of said imaging surface in the x and y directions, outputs from said first and second x-direction acceleration sensors and the rotational displacement amount in the x direction are provided to detect a correction amount in the x direction, and outputs from said first and second y-direction acceleration sensors and the rotational displacement amount in the y direction are provided to detect a correction amount in the y direction.

12. An apparatus according to claim 9, wherein an output from said acceleration sensor for detecting the rotational displacement is provided to detect a correction amount of the rotational displacement.

13. An apparatus according to claim 8, wherein outputs from said second and third x-direction acceleration sensors are provided to detect a correction amount of the rotational displacement.

14. An apparatus according to claim 11, wherein outputs from said first and second x-direction acceleration sensors and from said first and second y-direction acceleration sensors are provided to detect a correction amount of the rotational displacement.

* * * * *

UNITED STATES PATENT AND TRADEMARK OFFICE
CERTIFICATE OF CORRECTION

PATENT NO. : 5,155,520
DATED : October 13, 1992
INVENTOR(S) : NAGASAKI et al

It is certified that error appears in the above-identified patent and that said Letters Patent is hereby corrected as shown below:

Column 11, line 46 (claim 1), after "means", insert
--, arranged at a mounting position of said photographing optical lens system,--.

Column 11, line 50 (claim 1), after "means", insert
--, arranged at a mounting position of said imaging surface,--.

Column 11, line 54 (claim 1), change "correct" to
--correcting--.

Column 14, after claim 14, insert the following claims:

--<u>Claim 15</u>. A camera apparatus comprising:

a photographing optical lens system;

an imaging surface on which an object image is formed through said photographing optical lens system;

first displacement detection means for detecting a displacement associated with said photographing optical lens system within a plane perpendicular to an optical axis;

UNITED STATES PATENT AND TRADEMARK OFFICE
CERTIFICATE OF CORRECTION

PATENT NO. : 5,155,520
DATED : October 13, 1992
INVENTOR(S) : NAGASAKI et al It is certified that error appears in the above-identified patent and that said Letters Patent is hereby corrected as shown below:

second displacement detection means for detecting a displacement associated with said imaging surface within the plane perpndicular to the optical axis; and correcting means for correcting positional errors of the object image to be formed on said imaging surface by adjusting an optical, positional relationship between said photographing optical lens system and said imaging surface in accordance with displacement amounts detected by both said first and second displacement detection means;

said correcting means including one of an actuator mechanism for rotating said imaging surface in accordance with the detected displacement amounts and a mechanism for rotating the object image formed on the imaging surface.

<u>Claim 16</u>. A camera apparatus comprising:

a photographing optical lens system;

UNITED STATES PATENT AND TRADEMARK OFFICE
CERTIFICATE OF CORRECTION

PATENT NO. : 5,155,520
DATED : October 13, 1992
INVENTOR(S) : NAGASAKI et al

It is certified that error appears in the above-identified patent and that said Letters Patent is hereby corrected as shown below:

an imaging surface on which an object image is formed through said photographing optical lens system;

first displacement detection means for detecting a displacement associated with said photographing optical lens system within a plane perpendicular to an optical axis;

second displacement detection means for detecting a displacement associated with said imaging surface within the plane perpendicular to the optical axis; and correcting means for correcting positional errors of the object image to be formed on said imaging surface by adjusting an optical, positional relationship between said photographing optical lens system and said imaging surface in accordance with displacement amounts detected by both said first and second displacement detection means;

said first displacement detection means including a first x-direction acceleration sensor for detecting a

UNITED STATES PATENT AND TRADEMARK OFFICE
CERTIFICATE OF CORRECTION

PATENT NO. : 5,155,520
DATED : October 13, 1992
INVENTOR(S) : NAGASAKI et al It is certified that error appears in the above-identified patent and that said Letters Patent is hereby corrected as shown below:

lateral displacement of said photographing optical lens system about the optical axis, and a first y-direction acceleration sensor for detecting a longitudinal displacement of said photographing optical lens system; and said second displacement detection means including a second x-direction acceleration sensor for detecting a lateral displacement of said imaging surface about the optical axis, and a second y-direction acceleration sensor for detecting a longitudinal displacement of said imaging surface.

<u>Claim 17.</u> An apparatus according to claim 16, wherein said first and second x-direction acceleration sensors are arranged at positions which are symmetrical with each other about the optical axis, and said first and second y-direction acceleration sensors are arranged at

UNITED STATES PATENT AND TRADEMARK OFFICE
CERTIFICATE OF CORRECTION

PATENT NO. : 5,155,520
DATED : October 13, 1992
INVENTOR(S) : NAGASAKI et al

It is certified that error appears in the above-identified patent and that said Letters Patent is hereby corrected as shown below:

positions which are symmetrical with each other about the optical axis.

Claim 18. An apparatus according to claim 16, wherein said second displacement detection means includes a third x-direction acceleration sensor arranged at a position which is symmetrical with the position of said second x-direction acceleration sensor about the optical axis.

Claim 19. An apparatus according to claim 18, wherein outputs from said second and third x-direction acceleration seasors are provided to detect rotational displacement amounts of the imaging surface in the $x$ and $y$ directions, outputs from said first and second x-direction acceleration sensors and the rotational displacement amount in the $x$ direction are provided to detect a correction amount in the $x$ direction, and outputs from said first and second y-direction acceleration sensors and the rotational

UNITED STATES PATENT AND TRADEMARK OFFICE
CERTIFICATE OF CORRECTION

PATENT NO. : 5,155,520
DATED : October 13, 1992
INVENTOR(S) : NAGASAKI et al

It is certified that error appears in the above-identified patent and that said Letters Patent is hereby corrected as shown below:

displacement amount in the y direction are provided to detect a correction amount in the y direction.

Claim 20. An apparatus according to claim 16, wherein said second displacement detection means includes an acceleration sensor for detecting a rotation displacement.

Claim 21. An apparatus according to claim 16, wherein outputs from said first and second x-direction acceleration sensors are provided to detect a correction amount in the x direction, and outputs from said first and second y-direction acceleration sensors are provided to detect a correction amount in the y direction.

Claim 22. An apparatus according to claim 17, wherein outputs from said first and second x-direction acceleration sensors and from said first and second y-direction acceleration sensors are provided to detect rotational displacement amounts of said imaging surface in the x and y

UNITED STATES PATENT AND TRADEMARK OFFICE
CERTIFICATE OF CORRECTION

PATENT NO. : 5,155,520
DATED : October 13, 1992
INVENTOR(S) : NAGASAKI et al

It is certified that error appears in the above-identified patent and that said Letters Patent is hereby corrected as shown below:

directions, outputs from said first and second x-direction acceleration sensors and the rotational displacement amount in the $x$ direction are provided to detect a correction amount in the $x$ direction, and outputs from said first and second y-direction acceleration sensors and the rotational displacement amount in the $y$ direction are provided to detect a correction amount in the $y$ direction.

Claim 23. An apparatus according to claim 20, wherein an output from said acceleration sensor for detecting the rotational displacement is provided to detect a correction amount of the rotational displacement.

Claim 24. An apparatus according to claim 19, wherein outputs from said second and third x-direction acceleration sensors are provided to detect a correction amount of the rotational displacement.

UNITED STATES PATENT AND TRADEMARK OFFICE
CERTIFICATE OF CORRECTION

PATENT NO. : 5,155,520
DATED : October 13, 1992
INVENTOR(S) : NAGASAKI et al

It is certified that error appears in the above-identified patent and that said Letters Patent is hereby corrected as shown below:

Claim 25. An apparatus according to claim 22, wherein outputs from said first and second x-direction acceleration sensors and from said first and second y-direction acceleration sensors are provided to detect a correction amount of the rotational displacement. --

Signed and Sealed this

First Day of March, 1994

BRUCE LEHMAN

*Attest:*

*Attesting Officer*     *Commissioner of Patents and Trademarks*